United States Patent

[11] 3,631,752

[72] Inventor: Karl H. Frantzen, Omaha, Nebr.
[21] Appl. No.: 885,722
[22] Filed: Dec. 17, 1969
[45] Patented: Jan. 4, 1972
[73] Assignee: Northern Natural Gas Company, Omaha, Nebr.

[54] SUBSURFACE IRRIGATION PIPELINE DEVICE
11 Claims, 8 Drawing Figs.

[52] U.S. Cl. ........................................... 83/308,
    83/175, 83/310, 83/337, 83/579, 83/660, 83/925
[51] Int. Cl. ........................................... B26f 1/24
[50] Field of Search ..................................... 83/2, 30,
    925, 308, 309, 310, 337, 331, 54, 175, 169, 18, 22,
    660, 579

[56] References Cited

UNITED STATES PATENTS

| 2,236,160 | 3/1941 | Seaman | 83/310 |
| 2,683,208 | 7/1954 | Andrews | 83/925 UX |
| 2,753,001 | 7/1956 | Page | 83/30 X |
| 2,802,530 | 8/1957 | Kaufman | 83/169 X |
| 3,170,354 | 2/1965 | Scholl | 83/660 X |
| 3,355,974 | 12/1967 | Carmichael | 83/171 |

*Primary Examiner*—James M. Meister
*Attorney*—Merriam, Marshall, Shapiro & Klose ABSTRACT: A device for making orifices in a pipe comprising a rotatable member over which pipe is adapted to be placed and a rotating orifice-making member, which is substantially free of any movement along its longitudinal axis, adapted to make an orifice in the pipe.

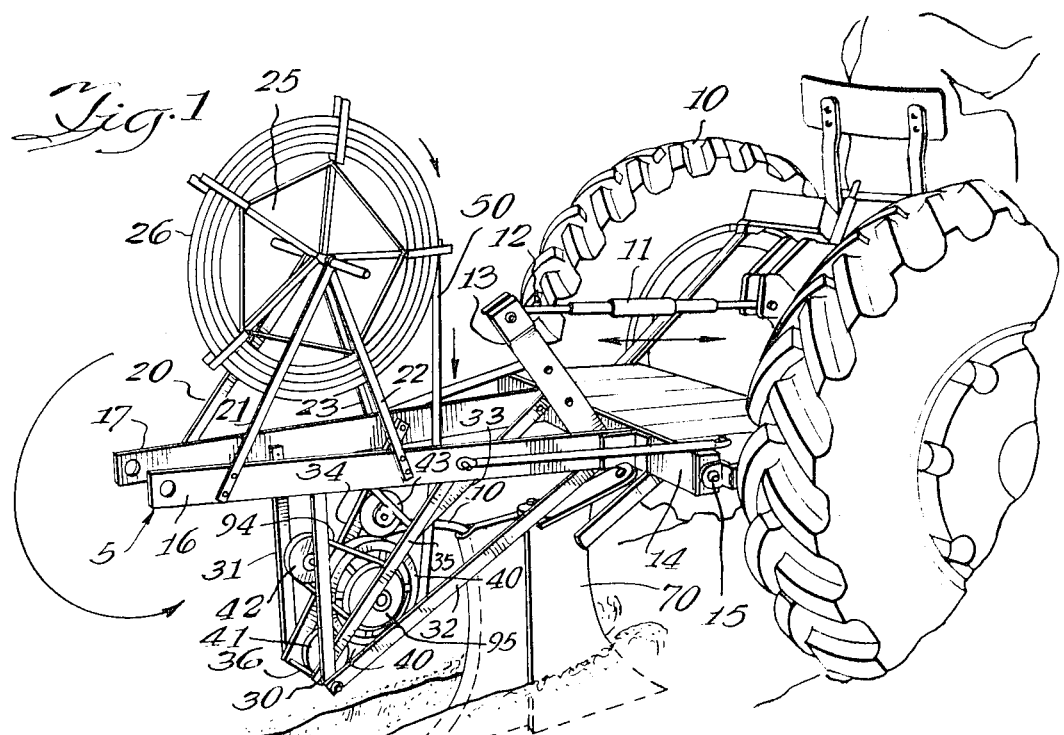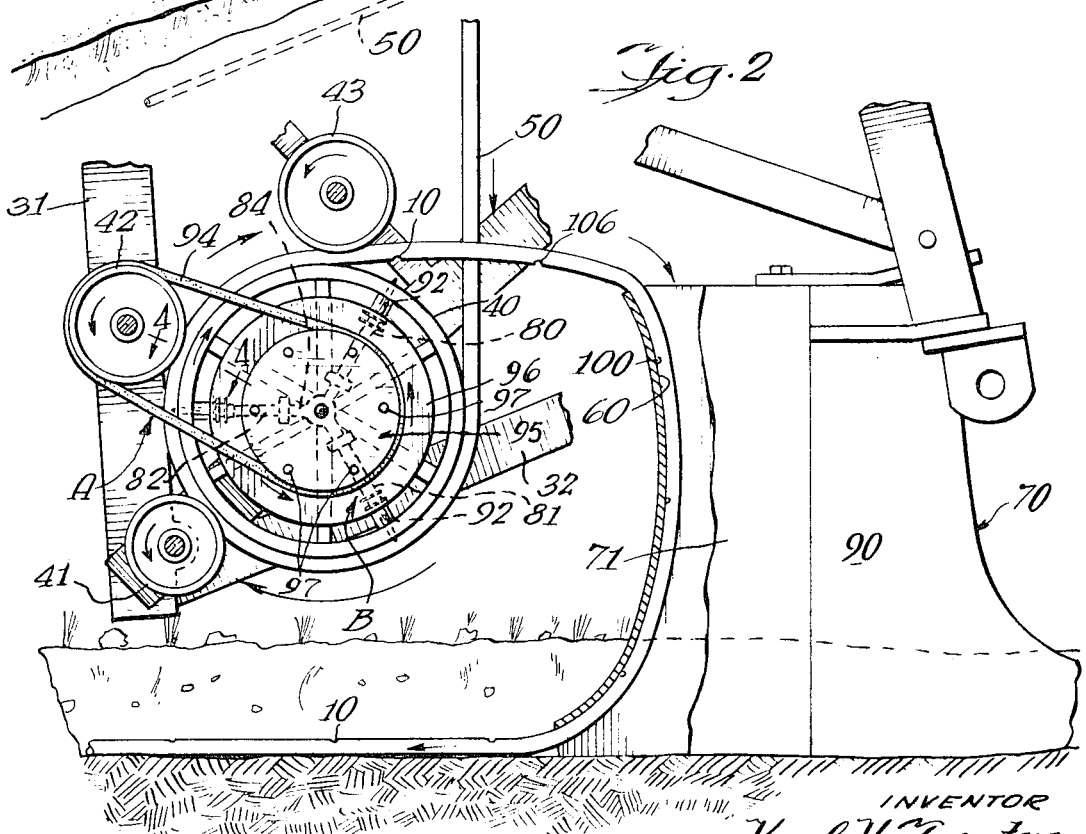

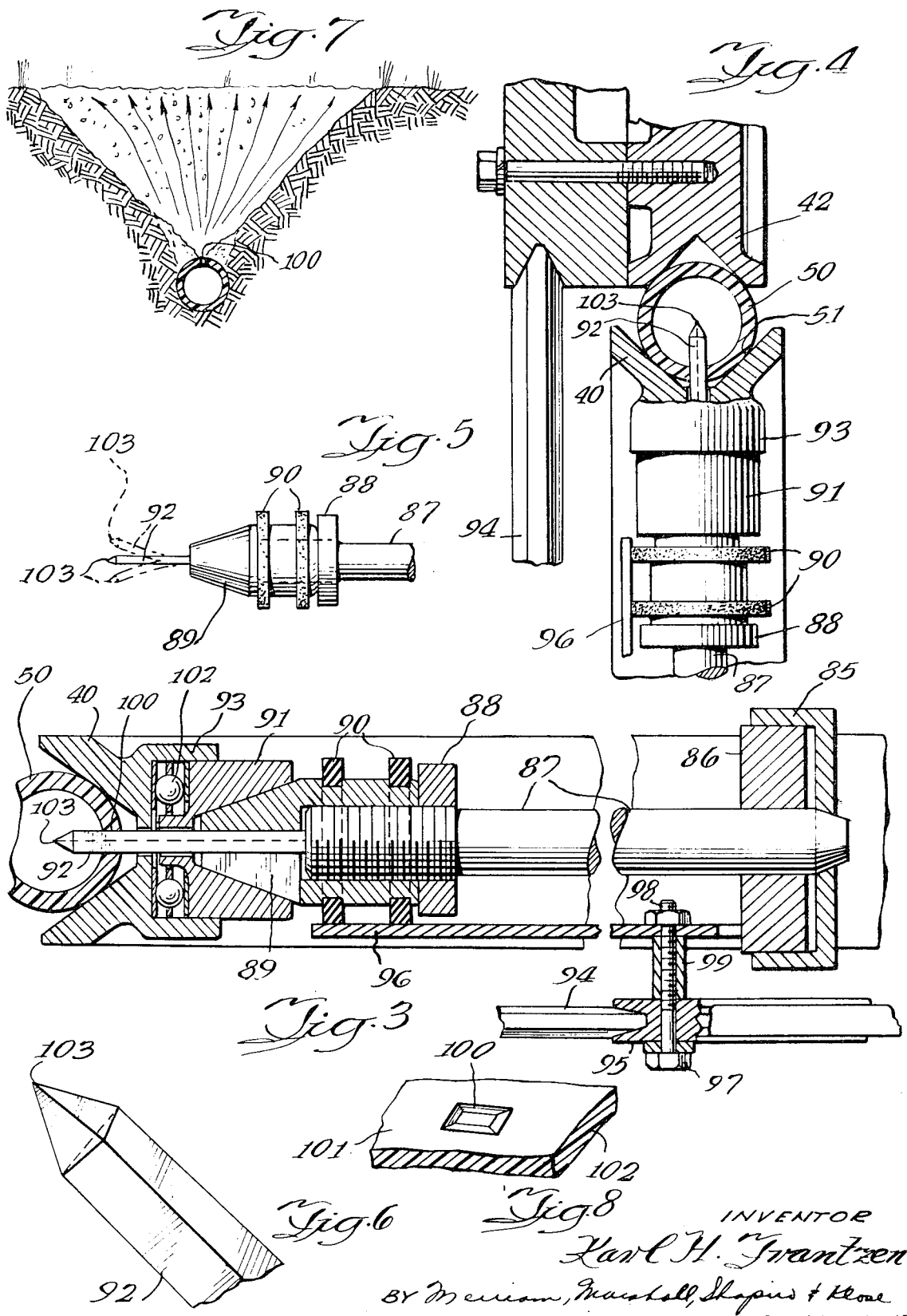

SUBSURFACE IRRIGATION PIPELINE DEVICE

This invention relates to a new and improved method and apparatus for providing subsurface irrigation and more specifically the providing of a pipe-laying, orifice-making device generally employed in areas where subsurface irrigation is required.

In many areas, it is necessary to provide supplemental water to the growing crop. A number of approaches have been used in the past including the spraying of water from fixed or movable headers located at or above the ground surface and letting the water seep into the ground. In many instances this approach has been unsatisfactory as a uniform supply of water is not supplied to the root zone of the crop.

Another approach that has been employed involves the use of subsurface irrigation in which water is supplied to a growing crop from openings or orifices in a buried pipe or header. The water is applied continuously to the root zone of the crop and at a low rate to minimize evaporation and percolation losses. The perforated pipes or headers are installed just below the plowing depth level and the water is allowed to rise up and spread laterally by capillary action. The depth of buried pipe and the spacing between pipes and the various orifices therein depend on a number of variables including the crop to be grown and the type of soil to be irrigated. A number of prior art patents such as U.S. Pat. No. 1,632,611 show the use of underground headers for dispensing water into the soil for irrigation purposes.

While is has been found desirous to have underground or subsurface irrigation systems, a number of problems have arisen in attempting to economically implement this type of irrigation system. In many instances it has been found that the orifices placed in the subsurface headers are not uniform such that too much or too little water is provided for irrigation purposes. Additionally the cost of installing such headers has been excessive. For example, in one system that has been used, a reciprocating and rotating pin has been employed to provide gyratory movement for the purpose of forming double-conical openings in a header to be buried under ground. Units employing the double-conical openings have not been too satisfactory.

In the new and unobvious method and apparatus of the present system, a subsurface irrigation header is perforated with substantially uniform size orifices immediately prior to positioning the header into the ground.

The orifice-making device of the present invention generally comprises a plurality of fixed, rotating piercing-swaging orifice-making members, which are mounted on a hub of a rotating sheave onto which the workpiece to be perforated, such as a polyethylene pipe, is positioned. The pipe, as it moves onto the sheave is pulled onto an orifice-making member. While the pipe rotates with the sheave, orifices are made in the pipe after which the perforated pipe is pulled off the sheave and orifice-making members with the perforated pipe moving in a direction away from the sheave and orifice-making members of the pipe-perforating laying device.

In the drawings:

FIG. 1 shows a fragmentary, perspective view of the subsurface pipe-laying and orifice-making apparatus of the present invention in an operative position behind a tractor which pulls the apparatus through a field or other particular area to be irrigated;

FIG. 2 shows a side fragmentary view of the orifice-making device of the present invention as it makes orifices in a pipe prior to laying the perforated pipe in an installed position below the ground surface;

FIG. 3 shows an enlarged fragmentary view of one of the orifice-making members shown in FIG. 2;

FIG. 4 shows a view along line 4—4 of FIG. 2 in which an orifice-making member of the present invention is making an orifice in the pipe to be installed;

FIG. 5 shows a portion of an orifice-making member of the present invention with its three-sided needle being shown in phantom as it is flexed out of its normal position in the course of an orifice-making operation;

FIG. 6 shows an enlarged, fragmentary, perspective view of the three-sided needle of FIG. 3;

FIG. 7 shows a cross-sectional view of a pipe installed in the ground with an orifice, made with the orifice-making device of the present invention, being located in the vertical axis of the installed pipe; and FIG. 8 shows a fragmentary, perspective view of the orifice made with the orifice-making device of the present invention, the orifice being shown in a relaxed or untensioned condition.

Referring to the drawings and more particularly FIG. 1 there is shown tractor 10 having a hydraulically or pneumatically actuated cylinder 11 with the end of piston rod 12 being attached to support arm 13 of the orifice-making, pipe-laying device 5 of the present invention. Arm 13 is disposed at an angle to bracket 14 which is attached to the end of tractor 10 in a pivotable manner by pins 15.

MOunting arms 16, 17 project outwardly from bracket 14 with one end of each of arms 16, 17 welded or fastened by other suitable means to bracket 14.

Mounted on arms 16, 17 are four legs 20, 21, 22, 23 which support rotatable pipe reel 25 which, as seen in FIG. 1, has pipe 26 wound in reel 25.

Sheave support members 30, 31 are joined to and suspended from arms 16, 17 respectively and intersect at their free ends with support members 32, 33 which project angularly outward and downward from arms 16, 17. A third pair of support members 34, 35 also depend from arms 16, 17 and intersect with the other pairs of members 30, 31, 32, 33 where a rod 36 is inserted through each of the free ends of the six support members and is bolted at each of its two ends.

A large sheave 40 is mounted for rotation between members 34, 35. Sheave 40 is grooved about its periphery having a contour such that a pipe 50 can travel in the groove. This is more clearly seen in FIG. 4 where pipe 50 is seated in groove 51. The groove has openings therein for the receipt of orifice-making members which will be discussed hereafter.

Smaller sheaves 41, 42, 43 are fastened for rotation to members 30, 31 and 34, 35 as seen in FIG. 1. These smaller sheaves are spaced in lose proximity to sheave 40 for the purpose of applying pressure to and maintaining pipe 50 in proper position as it rotates on sheave 40. Sheave 42 has a double groove, one groove being positioned to receive pipe 50 whereas the second groove is adapted to receive a V-belt 94.

In a pipe-laying operation, one end of pie 50, which can be made of polyethylene or the like, is pulled from reel 25, around sheave 40, and under sheaves 41, 42, 43. The pipe is then directed through tubular opening 60 located in a pipe-depositing trailer 71 attached to a plow or tine 70.

The free end of the pipe 50 is held fast so that upon forward movement of tractor 10, the pipe will be pulled from reel 25 as the tractor moves forward in a pipe-laying operation. Preferably, the pipe is filled with water or some other fluid or gas prior to any orifice-making operation so that the pipe is under tension radially and longitudinally. It has been found that having a pressure of about 1 p.s.i. acting on the wall of the pipe will assist in dislodging of chips or crumbs which are made in an orifice-making operation. Thus, as an orifice is made, any chips are pushed out of the pipe through the orifice.

Plot 70 will make a furrow in the ground and pipe 50 after it passes through opening 60 will be deposited in the furrow. The soil will fall back into the furrow after the plow has passed to close or cover up the furrow with the pipe deposited therein. An attachment can be fastened to the tractor which will push the soil back into place following the depositing of pipe in the furrow. As the tractor or other vehicle to which the device of the present invention is attached moves forward, the pipe to be laid is placed under tension. It has been found that the longitudinal pull on the pipe is about 50 pounds.

As sheave 40 rotates due to the pulling of tractor 10, it causes rotation of orifice-making members 80, 81, 82 which are employed for making orifices in pipe 50 immediately prior to depositing pipe 50 in the ground. While only three orifice-making members are shown in the drawings, it is appreciated a greater or smaller number of such members can be employed depending upon such variables as the spacing desired between orifices and the amount of water to be released into the ground.

FIG. 3 shows a side view of an orifice-making member of the present invention. A bearing holder 85 holds bearing 86 which is attached to a shaft 87 that is threaded along a portion of the shaft length along the end opposite the shaft bearing end. Locknut 88 is threaded onto shaft 87 and a Jacobs chuck 89 is threaded onto shaft 87. A number of rubber grommets or O-rings 90 are located on the outer diameter of chuck 89. A pilot bearing 91 for guiding the orifice-making member, rests in ball bearing 102 which is retained within bearing holder 93. A needle 92 is held in chuck 89 with its free end projecting into groove 51 of sheave 40 so that it will extend into the area which is normally occupied by at least one pipe wall during a pipe-laying operation.

As the pipe is pulled from reel 25, it will come in contact with and cause rotation of sheaves 41, 42 and 43. Rotation of sheave 43 which is connected to sheave 95 by belt 94 causes rotation of sheave 95 and disc 96. Sheave 95 is connected to disc 96 by means of bolts 97 and nuts 98 with spacing sleeves 99 located between the sheave 95 and disc. Disc 96 is positioned against O-rings 90 and chuck 89. As belt 94 rotates, sheave 95 and disc 96 are also rotated, which in turn causes rotation of O-rings 90, chuck 89, and needle 92.

FIGS. 2 and 4 show that as pipe is pulled from reel 25 over rotating sheave 40, a rotating orifice-making needle 92 enters pipe 50 and is rotated within the pipe as the pipe moves under sheaves 41, 42 and 43. The needle 92 is substantially free of any movement along its longitudinal axis. Rather pipe 50 is pulled onto orifice-making needle 92 and after the orifice is made in the pipe, pipe 50 is pulled off the rotating needle 92. This is seen in FIG. 2 where needle 92 has passed under sheave 43 and is pulled from the perforated pipe as the pipe changes from a circular to a substantially linear direction. Needle 92 continues to rotate with hub 84 about the axis of sheave 40. While the needle 92 rotates about its own axis due to interaction between O-rings 90 and rotating disc 96, there is no axial movement of the needle along said axis.

After the orifice-making operation in pipe 50, the perforated pipe travels through tubular opening 60 in trailer 71 attached to plow 70. The orifices made in the pipe are such that as the pipe is deposited in the furrow, orifices 100 are located facing upward or are on top of the deposited pipe. With the orifices located in the top of pipe 50, water passing through the orifices will pass upward and outwards as seen in FIG. 7 to provide the desired irrigating effect.

The needle employed for making orifices 100 is shown more clearly in FIG. 6. Needle 92 is preferably three-sided or delta-shaped throughout its length except at its free end where it comes to a point 103. In one embodiment of the needle there is a dimension of about 0.004 inch from the apex of two sides to the midpoint of the third side. The length of the needle portion which extends from the chuck is about 1¼ inches. This length of the needle permits flexure of the needle as it is pulled away from pipe 50. This feature is illustrated in FIG. 5 where needle 92 is shown in a flexed position.

It has been found as shown in FIG. 8 that the orifice made in the pipe by the orifice-making device of the present invention comprises somewhat of a rectangular shape with the walls of the orifice sloping or tapering inwardly from the outer pipe surface 101 to the inner surface 102. The longest length or axis of the rectangle extends along the longitudinal axis of the pipe. Initially, when the orifice is made while the pipe is under tension, the orifice is circular in shape. However, when the tension is released, the orifice will assume a rectangle shape. Generally pipe, and particularly plastic pipe, does not have constant uniformity in wall thickness or density throughout the length of the pipe. It has been found that placing the pipe under pressure in the course of an orifice-making operation assists in providing uniform orifice size. Moreover, after the pipe has been deposited in the ground and the pressure on the pipe is increased to about 10 p.s.i., (i.e., high pressure) the rectangular-shaped orifice will take on somewhat of an elliptical shape. This is quite desirable for when water is applied intermittently at a pressure of about 10 p.s.i., the orifice will close (high pressure) and open (low pressure) in such a manner that unclogging of the orifices is accomplished as dirt or other particles are displaced from the orifice. A portion of the rectangular shape is irregular and although it is not completely understood, it is believed this irregular portion is due to the flexing action of needle 92 as it is pulled out of pipe 50 following an orifice-making operation.

Preferably the needle used to make the orifices is made of a tool steel which permits suitable flexure of the needle.

In one installation in which about 12 miles of pipe was installed with the orifice-making pipe-laying apparatus of the present invention, only one needle broke in the course of making orifices in the pipe. MOreover it has been found that size of orifices made by the use of the apparatus of the present invention have been quite satisfactory with only a small variance in the discharge rate from the various orifices in the pipeline.

The foregoing detailed description has been given for clearness of understanding only, and no unnecessary limitations should be understood therefrom, as some modifications will be obvious to those skilled in the art.

I claim:

1. An apparatus for making orifices in pipe, said apparatus comprising:

a rotatable member upon which pipe is adapted to be placed;

said rotatable member including at least one orifice-making means for making an orifice in said pipe;

said orifice-making means being adapted to be rotated;

said orifice-making means being fixed from substantial axial movement along its longitudinal axis;

means for rotating said orifice-making means about said longitudinal axis; and, said orifice-making means having a portion thereof adapted to normally extend into said rotatable member and at least a wall of the pipe adapted to be placed on said rotatable member whereby pipe will come in contact with said orifice-making means as pipe is received by said rotatable member.

2. An orifice-making apparatus in accordance with claim 1 further including:

pressure means for holding pipe firmly against said rotatable member during an orifice-making operation.

3. An orifice-making apparatus in accordance with claim 1 wherein said rotatable member comprises a sheave upon which pipe is adapted to rest as it is conveyed by said rotatable member;

and at least one roller means located contiguous to said sheave for holding pipe to be conveyed, firmly against said rotatable member.

4. A pipe-laying apparatus for depositing pipe having orifices therein in the ground, said apparatus comprising:

pipe-carrying means for carrying a length of pipe free of orifices therein;

a rotatable member adapted to convey pipe from said pipe-carrying means;

said rotatable member including at least one orifice-making means for making an orifice in pipe conveyed by said pipe-rotatable member;

said orifice-making means being adapted to be rotated with said rotatable member;

said orifice-making means being fixed from substantial axial movement along its longitudinal axis;

means for rotating said orifice-making means about said axis; and, said orifice-making means having a portion thereof adapted to normally extend into a wall of a pipe adapted to be placed upon said rotatable member whereby pipe to be laid will come in contact with said orifice-making means as pipe is received by said rotatable member prior to laying said pipe.

5. A pipe-laying apparatus in accordance with claim 4 further including:
   pressure means for holding pipe firmly against said rotatable member.

6. A pipe-laying apparatus comprising:
   a reel member adapted to hold pipe to be laid;
   a rotatable sheave having an outer rim with a groove in the outer rim thereof whereby pipe to be laid is adapted to rest in said groove;
   a plurality of spaced roller means located in substantial alignment with said sheave and positioned contiguous to said groove;
   a plurality of spaced roller means located in substantial alignment with said sheave and positioned contiguous to said groove;
   at least one orifice-making means extending radially outward from said rotatable member for making orifices in pipe located in said groove;
   said orifice-making means being mounted on and adapted for rotation with said rotatable member;
   said orifice-making means being fixed from substantial axial movement along the longitudinal axis of said orifice-making means; and,
   said orifice-making means having a portion thereof which normally extends into said groove
   whereby pipe to be laid comes into contact with said portion when said pipe is deposited in said groove.

7. A pipe-laying device in accordance with claim 6 further including means for joining said orifice-making means to one of said roller means.

8. A pipe-laying device in accordance with claim 7 wherein said orifice-making means comprises a disc spaced from said rotatable member;
   an orifice-making needle normally positioned to extend into said groove;
   chuck means for holding said needle;
   and means associated with said chuck means for contacting said disc whereby said disc when rotated, will cause rotation of said chuck means about its longitudinal axis.

9. A pipe-laying device in accordance with claim 8 further including,
   said orifice-making needle being substantially three-sided along its length except at the end of said needle adapted to project into said groove where the three sides of said needle are tapered to a point.

10. A pipe-laying device in accordance with claim 9 wherein said needle is delta-shaped for a substantial portion of its length with the distance between the apex of two sides to the midpoint of the third side is about 0.004 inch.

11. A pipe-laying device in accordance with claim 10 wherein said needle is adapted to be flexed by said pipe subsequent to making an orifice in said pipe by said needle.

* * * * *